United States Patent
Zhu et al.

(10) Patent No.: US 12,003,100 B2
(45) Date of Patent: *Jun. 4, 2024

(54) JUMPER CABLE, STARTING POWER SUPPLY AND JUMP START DEVICE

(71) Applicant: SHENZHEN CAROSS CO., LTD, Shenzhen (CN)

(72) Inventors: Chunyi Zhu, Shenzhen (CN); Maolin Liang, Shenzhen (CN)

(73) Assignee: Shenzhen Caross Co., Ltd, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,228

(22) Filed: Sep. 13, 2022

(65) Prior Publication Data

US 2023/0198255 A1    Jun. 22, 2023

Related U.S. Application Data

(63) Continuation of application No. 17/683,223, filed on Feb. 28, 2022, now Pat. No. 11,482,860.

(30) Foreign Application Priority Data

Dec. 17, 2021 (CN) .......................... 202111555269.2

(51) Int. Cl.
  *H02J 1/10* (2006.01)
  *H02J 7/00* (2006.01)
  *H02J 7/34* (2006.01)

(52) U.S. Cl.
  CPC ............ *H02J 1/122* (2020.01); *H02J 7/0034* (2013.01); *H02J 7/00711* (2020.01); *H02J 7/342* (2020.01)

(58) Field of Classification Search
  CPC ...... H02J 1/122; H02J 7/0034; H02J 7/00711; H02J 7/342; H02J 7/0045; H01R 11/22; H01R 4/48; H02H 11/002
  (Continued)

(56) References Cited

U.S. PATENT DOCUMENTS 5,993,250 A  * 11/1999 Hayman ................. H02J 1/122
                                                              320/105
11,303,122 B1 * 4/2022 Zhu ......................... H02J 1/122
(Continued)

FOREIGN PATENT DOCUMENTS

GB        2595961 A  * 12/2021    ........... B60R 16/033

OTHER PUBLICATIONS

European search report, 22161410-1202, dated Sep. 28, 2022(7 pages).

*Primary Examiner* — M Baye Diao

(57) ABSTRACT

Disclosed are a jumper cable, a starting power supply and a jump start device. The jumper cable includes first and second input terminals respectively configured to be connected with positive and negative electrodes of a starting power supply; first and second clamps respectively configured to be clamped to positive and negative electrodes of a vehicle battery; the second input terminal and the second clamp are electrically connected; a switching device, wherein the first input terminal and the first clamp are electrically connected through the switching device; and a non-MCU controlling circuit electrically connected with a controlling terminal of the switching device, configured to control the switching device to be switched on when the clamps are properly connected to the electrodes of the vehicle battery, and configured to not control the switching device to be switched on when the clamps are reversely connected to the electrodes of the vehicle battery.

18 Claims, 9 Drawing Sheets

(58) Field of Classification Search
USPC ......................................................... 320/105
See application file for complete search history.

(56) References Cited

U.S. PATENT DOCUMENTS

| | | |
|---|---|---|
| 2005/0116688 A1 | 6/2005 | Weiguang |
| 2006/0145655 A1 | 7/2006 | Sheng |
| 2009/0174362 A1* | 7/2009 | Richardson ............ H02J 7/0034 |
| | | 320/105 |
| 2010/0283623 A1 | 11/2010 | Baxter et al. |
| 2019/0084509 A1* | 3/2019 | Toscani .................... B60L 53/14 |

* cited by examiner

JUMPER CABLE, STARTING POWER SUPPLY AND JUMP START DEVICE

CROSS REFERENCE OF RELATED APPLICATION

The present application is a Continuation Application of U.S. patent application Ser. No. 17/683,223, filed on Feb. 28, 2022, which claims the priority of Chinese Patent Application No. 202111555269.2, filed on Dec. 17, 2021, the entire contents of which are hereby incorporated by reference.

TECHNICAL FIELD

The present disclosure relates to electronic technology, and particularly to a jumper cable, a starting power supply and a jump start device.

BACKGROUND

An external starting power supply is usually needed when a vehicle is started, the starting power supply and the vehicle battery are connected through a jumper cable, the starting power supply boosts the vehicle battery through the jumper cable, such that ignition of the vehicle can be achieved.

To achieve a success of boosting the vehicle battery, it must be ensured that a positive electrode and a negative electrode of the starting power supply are correctly connected to a positive electrode and a negative electrode of the vehicle battery through the jumper cable respectively, i.e., the positive electrode of the starting power supply should be connected with the positive electrode of the vehicle battery through the jumper cable, and the negative electrode of the starting power supply should be connected with the negative electrode of the vehicle battery through the jumper cable. Once there is an accidental reverse connection, not only a normal start of the ignition cannot be achieved, which causes an influence on the user's demand of using the vehicle, but also it may even lead to a fire caused by short circuit, a damage on the starting power supply or even the entire vehicle electrical system and other safety hazards, therefore, a reverse connection protection is a problem need to be solved during ignition of the vehicle.

SUMMARY

In view of the above, the present disclosure provides a jumper cable and a starting power supply having a protection function for a reverse connection.

A first aspect of embodiments of the present disclosure provides a jumper cable, comprising:

a first input terminal configured to be connected with a positive electrode of a starting power supply; a second input terminal configured to be connected with a negative electrode of the starting power supply; a first clamp configured to be clamped to a positive electrode of a vehicle battery; and a second clamp configured to be clamped to a negative electrode of the vehicle battery; wherein the second input terminal and the second clamp are electrically connected;

a switching device, wherein the first input terminal and the first clamp are electrically connected through the switching device; and a controlling circuit electrically connected with a controlling terminal of the switching device, configured to control the switching device to be switched on when the first clamp and the second clamp are properly connected to the electrodes of the vehicle battery such that a path is formed between the starting power supply and the vehicle battery; and configured to not control the switching device to be switched on when the first clamp and the second clamp are reversely connected to the electrodes of the vehicle battery such that the path is not formed between the starting power supply and the vehicle battery; wherein the controlling circuit does not include a MCU.

A second aspect of embodiments of the present disclosure provides a starting power supply configured to be connected to a jumper cable having first and second input terminals, the starting power supply comprises a positive electrode and a negative electrode, the negative electrode is configured to electrically connect the second input terminal of the jumper cable; the jumper cable further comprises a first clamp configured to be clamped to a positive electrode of a vehicle battery and a second clamp configured to be clamped to a negative electrode of the vehicle battery; the first input terminal is electrically connected with the first clamp, and the second input terminal is electrically connected with the second clamp;

wherein the starting power supply further comprises:

a switching device, wherein the first input terminal and the positive electrode of the starting power supply are electrically connected through the switching device; and a controlling circuit electrically connected with a controlling terminal of the switching device, configured to control the switching device to be switched on when the first clamp and the second clamp are properly connected to the electrodes of the vehicle battery such that a path is formed between the starting power supply and the vehicle battery; and configured to not control the switching device to be switched on when the first clamp and the second clamp are reversely connected to the electrodes of the vehicle battery such that the path is not formed between the starting power supply and the vehicle battery; wherein the controlling circuit does not include a MCU.

A third aspect of embodiments of the present disclosure provides a jump start device, comprising a starting power supply and a jumper cable as described above.

In the embodiments of the present disclosure, when two clamps of the jumper cable are reversely connected with two electrodes of the vehicle battery, i.e., the first clamp is clamped to the negative electrode of the vehicle battery and the second clamp is clamped to the positive electrode of the vehicle battery, the controlling circuit will not control the switching device to be switched on, such that a reverse path is not formed between the starting power supply and the vehicle battery, therefore the fire caused by short circuit and damages on the starting power supply will not happen, which may offer an imperative protection for the reverse connection.

DESCRIPTION OF THE EMBODIMENTS

In order to make the inventive objects, technical solution, and advantages of the present disclosure more apparent and understandable, hereafter the present disclosure will be further described in detail in conjunction with the accompanying drawings and the embodiments. It should be understood that embodiments described herein are intended only to explain and not to qualify the present disclosure.

Figure 1:
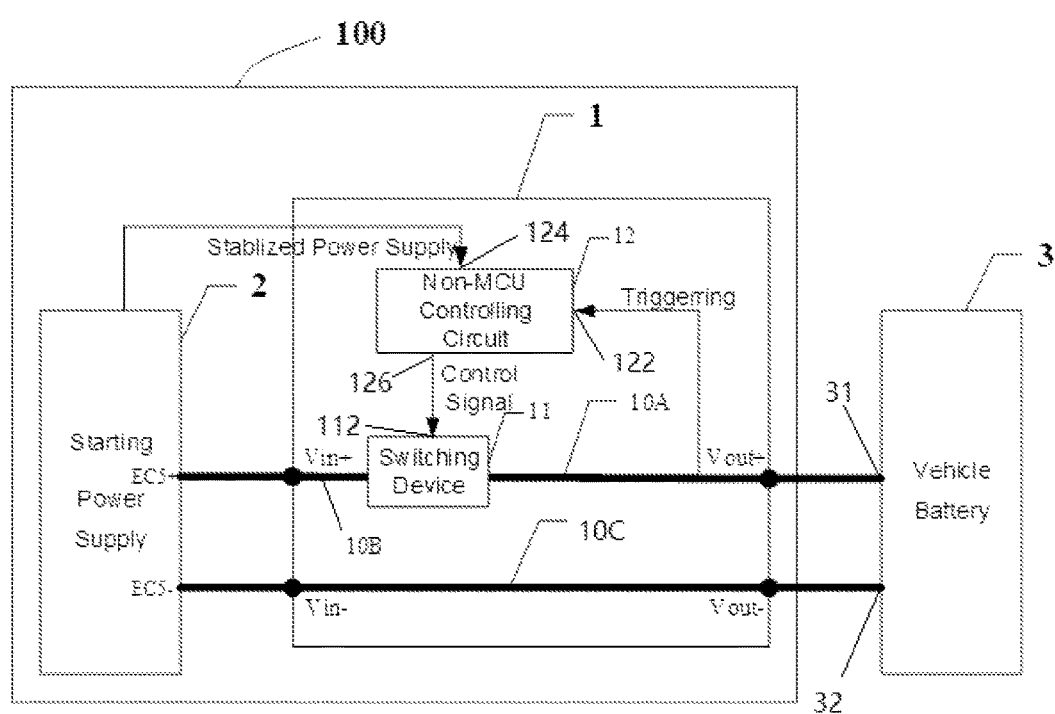
FIG. 1 is a block diagram of a jump start device according to a first embodiment of the present disclosure.
Figure 2:
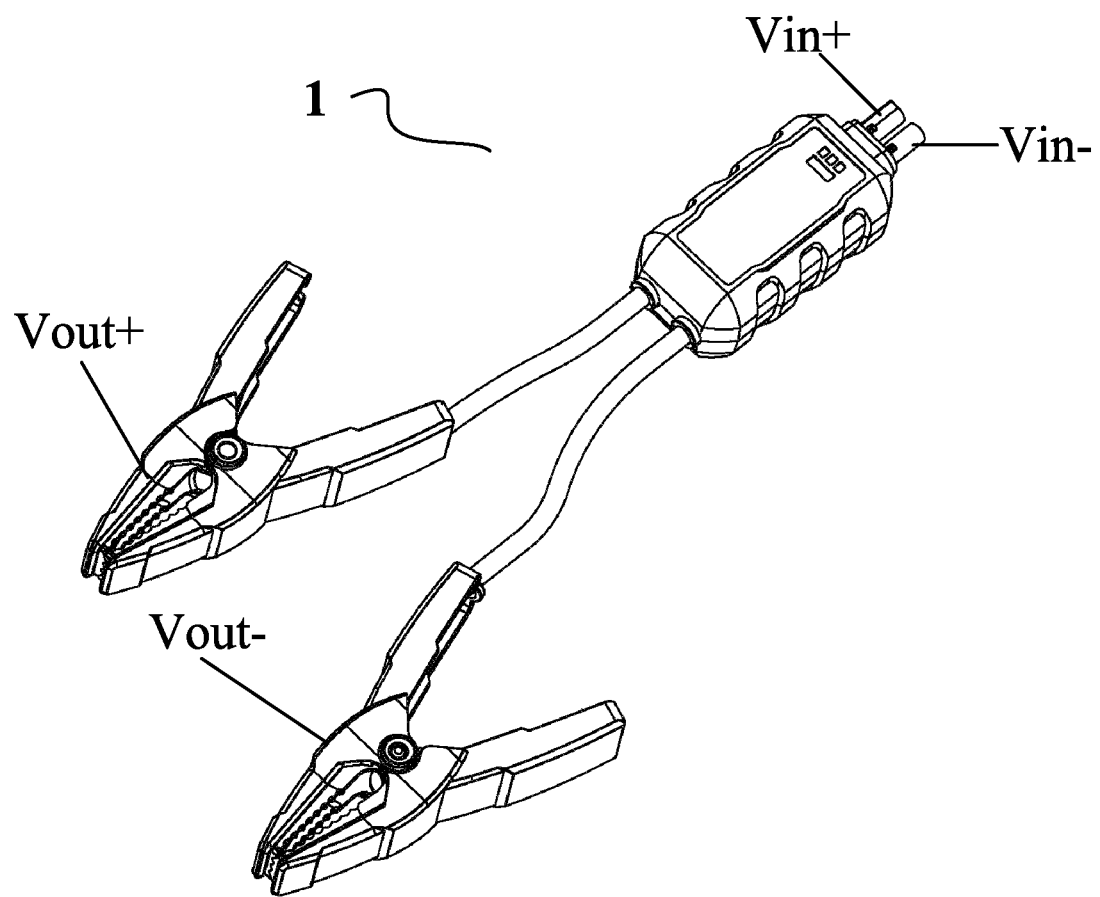
FIG. 2 is a structural schematic view of a jumper cable of the jump start device according to the first embodiment of the present disclosure.

A first embodiment of the present disclosure provides a jumper cable and a jump start device including the jumper cable, the jumper cable may be applied to an emergency start of a vehicle. Referring to FIG. 1 and FIG. 2, the jump start device 100 includes a jumper cable 1 and a starting power supply 2. The jumper cable 1 is connected between the starting power supply 2 and a vehicle battery 3. When the vehicle battery 3 has insufficient energy storage because of aging or other reasons, the starting power supply 2 can be used to boost the vehicle battery 3 through the jumper cable 1 for ignition of the vehicle. The starting power supply 2 is preferably a portable power supply such as a portable battery.

The jumper cable 1 includes input terminals and output terminals. The input terminals are connected with the starting power supply 1, and the output terminals are connected with the vehicle battery 3.

Specifically, as shown in FIG. 1 and FIG. 2, the input terminals include a first input terminal Vin+ connected with a positive electrode EC5+ of the starting power supply 2 and a second input terminal Vin– connected with a negative electrode EC5– of the starting power supply 2. The output terminals may be designed in the form of clamps, and include a first clamp Vout+ configured to be clamped to a positive electrode 31 of the vehicle battery 3 and a second clamp Vout– configured to be clamped to a negative electrode 32 of the vehicle battery 3. A part of the first clamp Vout+ and a part of the second clamp Vout– to contact electrodes 31, 32 of a vehicle battery are made of a conductive material, and when the first clamp and the second clamp are clamped to the electrodes 31, 32 of the vehicle battery 3, an electrical connection may be formed between the electrodes 31, 32 of the vehicle battery 3 and the two clamps.

The jumper cable 2 further includes a switching device 11 and a non-MCU controlling circuit 12 which are disposed in an interior of the jumper cable 2. The switching device 11 is electrically connected between the first input terminal Vin+ and the first clamp Vout+. Specifically, one end of the switching device 11 is connected with the first input terminal Vin+ through a first wire 10A, the other end of the switching device 11 is connected with the first clamp Vout+ through a second wire 10B, and the second input terminal Vin– and the second clamp Vout– are electrically connected through a third wire 10c. In addition, the non-MCU controlling circuit 12 is electrically connected with a controlling terminal of the switching device 11, and the switching device 11 is controlled by the non-MCU controlling circuit 12 to be switched on or off. The non-MCU controlling circuit 12 refers to a circuit structure that does not include a MCU (Microcontroller Unit), and is entirely designed into a hardware circuit, thereby facilitating to improve the overall response speed of the jumper cable.

As one implementation, the switching device 11 may be implemented based on a power relay, of course, it may also be implemented by using other controllable switching component or switching circuit. Further, in order to facilitate an overall control, a normal state of the switching device 11 is an off state.

Thus, when the input terminals and the output terminals of the jumper cable 2 are correctly connected to the electrodes of the starting power supply 2 and the vehicle battery 3 respectively, and the switching device 11 is controlled by the non-MCU controlling circuit 12 to be switched on, the starting power supply 2 can boost the vehicle battery 3 through the jumper cable 1.

It should be noted that, in the specific embodiment, a corresponding control and management circuit may be provided in the jumper cable 1 or in the starting power supply 2 according to an actual requirement, such that a boosting process may be managed.

For the input terminals, it is required that the first input terminal Vin+ is connected with the positive electrode of the starting power supply 2 and the second input terminal Vin– is connected with the negative electrode of the starting power supply for normal use. For this purpose, the first input terminal Vin+ and the second input terminal Vin– may be designed into different interface forms. For example, the shapes of the two interfaces may be different, or the pins in the two interfaces may be arranged in different ways, thereby preventing the two input terminals from being connected reversely with the starting power supply 2.

For the output terminals, it is required that the first clamp Vout+ is clamped to the positive electrode 31 of the vehicle battery 3 and the second clamp Vout– is clamped to the negative electrode 32 of the vehicle battery 3 for normal use. For this purpose, the two clamps may be designed in different colors for distinction. For example, the first clamp Vout+ is designed into redness and the second clamp Vout– is designed into blackness. However, in use, there is still a possibility to reversely connect the two clamps with the vehicle battery 3 by mistake, that is, the first clamp Vout+ is clamped to the negative electrode 32 of the vehicle battery 3 and the second clamp Vout– is clamped to the positive electrode 31 of the vehicle battery 3, which is called as reverse connection.

To avoid an undesirable result which may be caused by reversely connecting the two clamps of the output terminal with the vehicle battery 3, in this embodiment, the non-MCU controlling circuit 12 is configured to control the switching device 11 to be switched on when the first clamp Vout+ and the second clamp Vout– are properly connected to the electrodes 31, 32 of the vehicle battery 3, such that a circuit path is formed between the starting power supply 2 and the vehicle battery 3; and configured to not control the switching device 2 to be switched on when the first clamp Vout+ and the second clamp Vout– are reversely connected to the electrodes 31, 32 of the vehicle battery 3, such that no path is formed between the starting power supply 2 and the vehicle battery 3.

This will ensure that, when the jumper cable 1 and the vehicle battery 3 are connected reversely, no path is formed between the starting power supply 2 and the vehicle battery 3. A fire caused by a short circuit due to the reverse connection, which will damage the starting power supply 1 and the whole vehicle electrical system, can be avoided, therefore an imperative protection can be offered in case of reverse connection.

Further referring to FIG. 1, the non-MCU controlling circuit 12 includes a triggering terminal 122, and the triggering terminal 122 is connected in circuit between the first clamp Vout+ and the switching device 11. Meanwhile, the non-MCU controlling circuit 12 further includes a power terminal 124 and an output terminal 126; the power terminal 124 is configured to be connected with a stabilized power supply. As an implement way, the stabilized power supply may be an output of the starting power supply 12 after a voltage stabilization; and the output terminal 126 is configured to be electrically connected with the control terminal 112 of the switching device 11 and to output a control signal to the switching device 11 to control the switching device 11 to be switched on or switched off.

Figure 3:
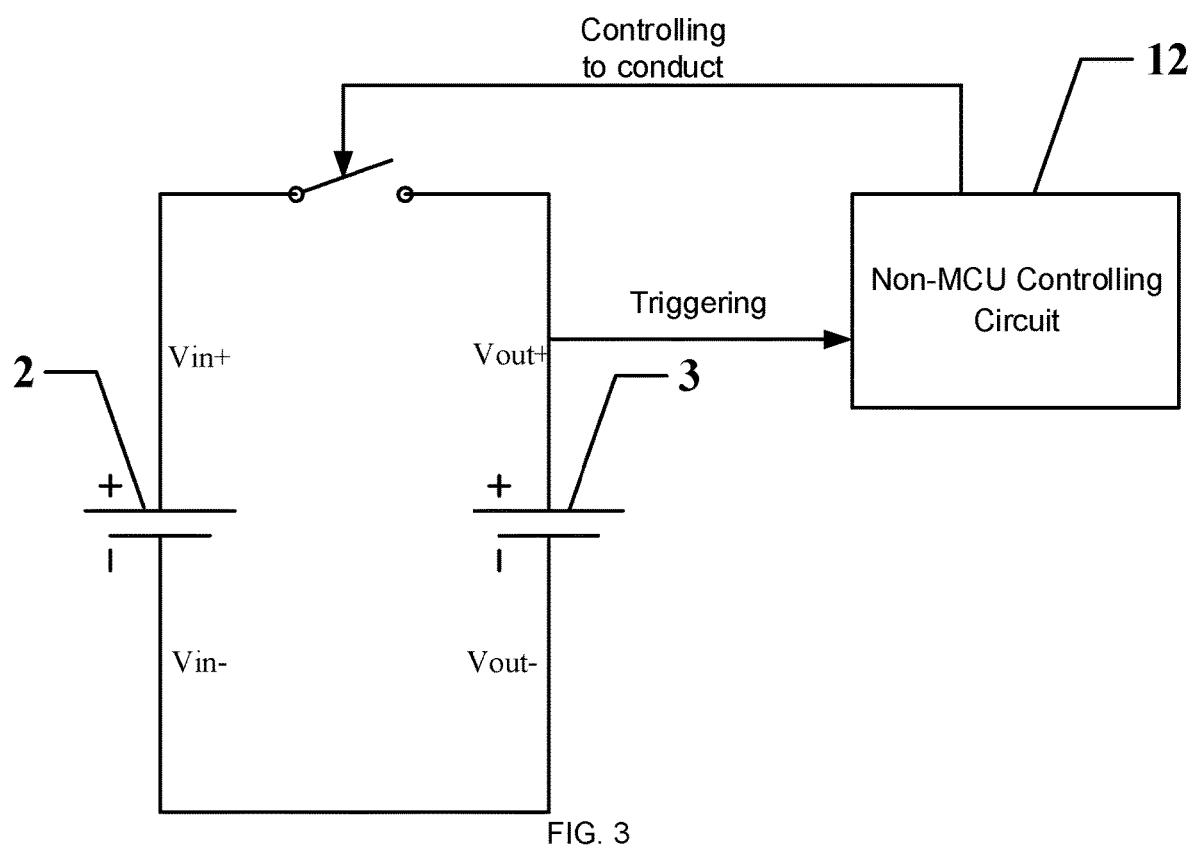
FIG. 3 is an equivalent circuit diagram illustrating the jumper cable according to the first embodiment of the present disclosure being properly connected to the electrodes of the vehicle battery.

When the two clamps of the jumper cable 1 are properly connected to the two electrodes of the vehicle battery 3, the positive electrode of the vehicle battery 3 will provide an electrical signal to the triggering terminal 122 of the non-MCU controlling circuit 12 through the first clamp Vout+ to achieve a trigger, that is, the triggering terminal 122 can get electricity from the circuit between the first clamp Vout+ and the switching device 11. When the non-MCU controlling circuit is triggered, it controls the switching device 11 to be switched on, and the starting power supply 2 will boost the vehicle battery 3. An equivalent circuit is shown in FIG. 3, it can be seen that the starting power supply 2 and the vehicle battery 3 are equivalent to two battery units in parallel here.

Figure 4:
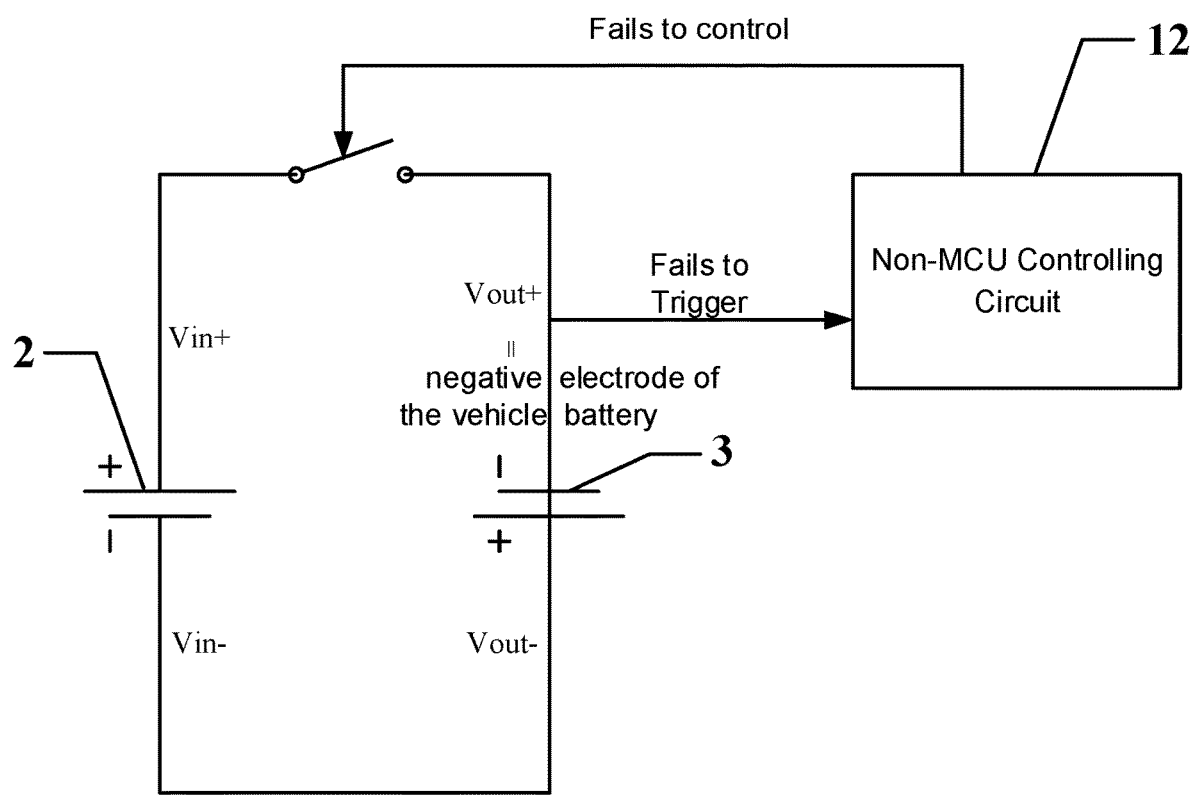
FIG. 4 is an equivalent circuit diagram illustrating the jumper cable according to the first embodiment of the present disclosure being reversely connected to the electrodes of the vehicle battery.

When the two clamps of the jumper cable 1 are reversely connected to the two electrodes of the vehicle battery 3, in this case, the first clamp Vout+ is electrically connected to the negative electrode of the vehicle battery 3, but the negative electrode provides no electrical signal to the triggering terminal 122 of the non-MCU controlling circuit 12, such that the triggering terminal 122 fails to get electricity from the circuit between the first clamp Vout+ and the switching device 11, the non-MCU controlling circuit 12 cannot be triggered and thus fails to control the switching device 11 to be switched on. The equivalent circuit is shown in FIG. 4, it can be seen that this starting power supply 2 and the vehicle battery 3 are equivalent to two battery units in series without forming a path in this case.

Figure 5:
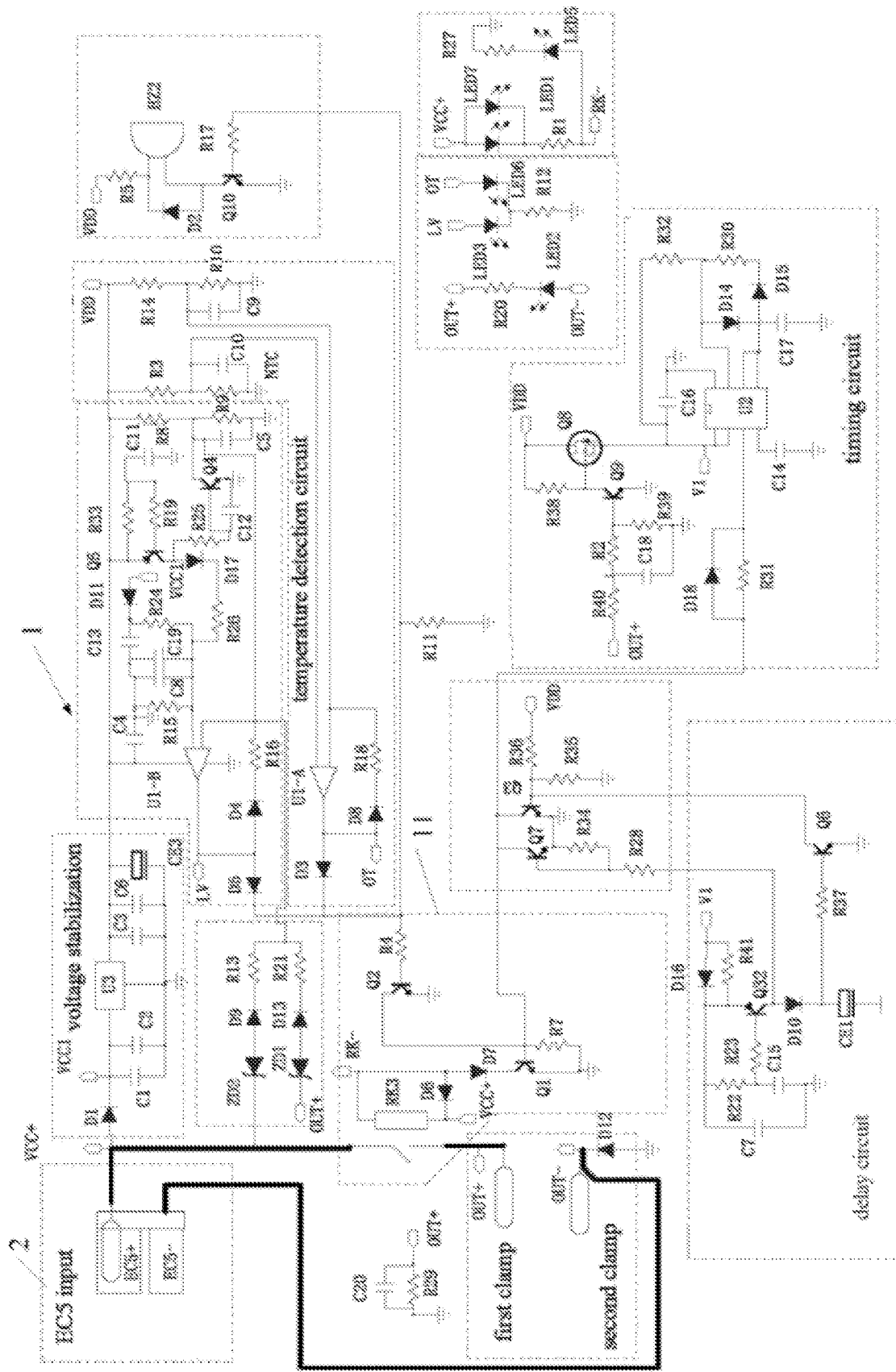
FIG. 5 is an exemplary structural circuit of the jumper cable in the first embodiment of the present disclosure.

Furthermore, referring to FIG. 5, the non-MCU controlling circuit 12 includes a timing circuit electrically connected with the controlling terminal of the switching device 11. The timing circuit includes the triggering terminal 122 and is configured to output a control signal to the controlling terminal of the switching device 11 when the triggering terminal 122 gets electricity. The control signal is configured to control the switching device 11 to circularly execute activities of switch-on and switch-off in accordance with a preset switching frequency when the starting power supply 11 boosts the vehicle battery 2, to detect whether the first clamp and the second clamp are still connected to the vehicle battery, i.e., to detect whether the first clamp Vout+ and/or the second clamp Vout- are removed by the user from the vehicle battery 3. For example, once the first clamp Vout+ is removed, the vehicle battery 3 cannot get electricity through the first clamp Vout+ and the switching device 11 will not continue to work, and the switching device 11 will return to the normal off-state.

FIG. 5 is an exemplary structural circuit of the jumper cable in the first embodiment of the present disclosure. The switching device 11 is implemented based on a relay, and specifically includes the relay and an output controlling circuit thereof. The output control circuit includes a triode Q1, a triode Q2, a resistor R7, a diode D6 and a diode D7. The specific connection relationship is shown in FIG. 5.

Referring to FIG. 5, the timing circuit includes a timing management chip U2, a first triode Q9 being an NPN transistor, and a first MOS transistor Q8. A base of the first triode Q9 serves as the triggering terminal 122, and an output terminal 126 of the timing management chip U2 is electrically connected with the controlling terminal of the switching device and is configured to output the control signal.

When the first clamp Vout+ and the second clamp Vout- are correctly connected to the electrodes of the vehicle battery 3, the voltage of the vehicle battery 3 is supplied to the base of the first triode Q9 through the first clamp Vout+ via the positive electrode of the vehicle battery 3, and the first triode Q9 controls the first MOS transistor Q8 to be switched on, such that, an output of the starting power supply 1 supplies power, after a voltage stabilization, to the timing management chip U2 through the first MOS transistor Q8.

Figure 6:
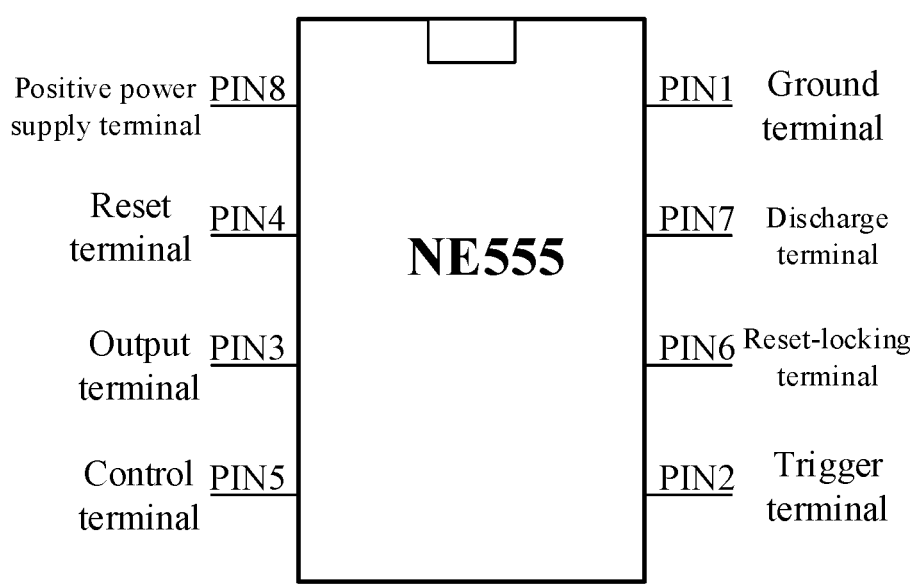
FIG. 6 is a schematic diagram illustrating pins of a timing management chip in FIG. 5.

As a option, the timing management chip U2 may be an NE555 timing chip, with eight pins PIN1-PIN8 thereof shown in FIG. 6.

In case that the timing management chip U2 is an NE555 timing chip, as shown in FIG. 5, the timing circuit further includes: a first resistor R2, a second resistor R30, a third resistor R31, a fourth resistor R32, a fifth resistor R38, a first capacitor C14, a second capacitor C16, a third capacitor C17, a first diode D14, and a second diode D15.

A first terminal of the first resistor R2 is electrically connected with the first clamp, a second terminal of the first resistor R2 is electrically connected with the base of the first triode Q9, an emitter of the first triode Q9 is grounded, after the voltage stabilization, the output of the starting power supply is electrically connected with a collector of the first triode Q9 through the fifth resistor R38.

The output of the starting power supply after voltage stabilization is connected with a source of the first MOS transistor Q8; a gate of the first MOS transistor Q8 is electrically connected with the collector of the first triode Q9, and a drain of the first MOS transistor Q8 is grounded through the second capacitor C16.

A first pin of the timing management chip U2 is grounded, a fifth pin of the timing management chip U2 is grounded through the first capacitor C14, a fourth pin and an eighth pin of the timing management chip U2 are both electrically connected with the drain of the first MOS transistor Q8. A second pin and a sixth pin of the timing management chip U2 are both electrically connected with a first terminal of the third capacitor C17, and a second terminal of the third capacitor C17 is grounded. The second pin and the sixth pin of the timing management chip U2 are both electrically connected with an anode of the second diode D15, and a cathode of the second diode D15 is electrically connected with the drain of the first MOS transistor Q8 successively through the second resistor R30 and the fourth resistor R32. A seventh pin of the timing management chip U2 is electrically connected with an anode of the first diode D14, and a cathode of the first diode D14 is electrically connected with the first terminal of the third capacitor C17. The seventh pin of the timing management chip U2 is further electrically connected with a connection point between the second resistor R30 and the fourth resistor R32 which are connected in series. A third pin of the timing management chip U2 is electrically connected with the controlling terminal 112 of the switching device through the third resistor R31.

Furthermore, the timing circuit further includes: a sixth resistor R39, a seventh resistor R40, a fourth capacitor C18, and a sixth diode D18. The first terminal of the first resistor R2 is electrically connected with the first clamp through the seventh resistor R40. The base of the first transistor Q9 is grounded through the sixth resistor R39. The first terminal of the first resistor R2 is grounded through the fourth capacitance C18. The sixth diode D18 is connected with the third resistor R31 in parallel at two ends of the third resistor R31. An anode of the sixth diode D18 is electrically connected with the controlling terminal of the switching device, and a cathode of the sixth diode D18 is electrically connected with the third pin of the timing management chip U2. The sixth resistor R39, the seventh resistor R40, the fourth capacitor C18, and the sixth diode D18 are mainly used for filtering, absorption and so on, and to maintain a stable work of the timing circuit.

In addition to the timing circuit, in the present embodiment, the jumper cable further includes a delay circuit. An output of the delay circuit is electrically connected with the controlling terminal of the switching device, and is configured to further control a maximum switching-on duration of the switching device in a delay manner when the timing circuit controls the switching device, and controls the switching device to be switched off when a present starting ignition time reaches a preset maximum switching-on time. The purpose of setting the maximum switching-on time is to limit a user's ignition time. The user must complete the ignition within a preset time, thereby preventing a low battery or a high temperature of the starting power supply 1 caused by a long ignition time.

Referring to FIG. 5, the delay circuit includes: a fourth diode D10, a second triode Q32 of a PNP transistor, a third triode Q6 of a NPN transistor, an eighth resistor R22, a ninth resistor R23, a tenth resistor R37, an eleventh resistor R41, a fifth capacitor C15, an electrolytic capacitor CE1, a fourth triode Q3 of a NPN transistor, a fifth triode Q7 of a NPN transistor, a twelfth resistor R28, and a thirteenth resistor R36.

The drain of the first MOS transistor Q8 is grounded successively through the eighth resistor R22 and the fifth capacitor C15, and a connection point between the eighth resistor R22 and the fifth capacitor C15 which are connected in series is electrically connected to a base the second triode Q32 through the ninth resistor R23. An emitter of the second triode Q32 is electrically connected with a drain of the first MOS transistor Q8 through the eleventh resistor R41. A collector of the second triode Q32 is connected with an anode of the fourth diode D10. A cathode of the fourth diode D10 is connected with a positive terminal of the electrolytic capacitor CE1, and a negative terminal of the electrolytic capacitor CE1 is grounded.

The cathode of the fourth diode D10 is electrically connected to a base of the third triode Q6 through the tenth resistor R37. An emitter of the third triode Q6 is grounded, and a collector of the third triode Q6 is electrically connected with a base of the fourth triode Q3.

The output of the starting power supply goes through the voltage stabilization, and then is electrically connected with the base of the fourth triode Q3 through the thirteenth resistor R36. A collector of the fourth triode Q3 is connected with the controlling terminal of the switching device. An emitter of the fourth triode Q3 is grounded.

A collector of the fifth triode Q7 is electrically connected with the controlling terminal of the switching device, an emitter of the fifth triode Q7 is grounded, and a base of the fifth triode Q7 is electrically connected with the collector of the second triode Q32 through the twelfth resistor R28.

Furthermore, the delay circuit further includes: a sixth capacitor C7, a fifth diode D16, a fourteenth resistor R34, and a fifteenth resistor R35. The fifth diode D16 is connected to two ends of the eleventh resistor R41 in parallel. An anode of the fifth diode D16 is connected with the drain of the first MOS transistor Q8, a cathode of the fifth diode D16 is electrically connected with the emitter of the second triode Q32, and the cathode of the fifth diode D16 is grounded through the sixth capacitor C7. The base of the fourth triode Q3 is grounded through the fifteenth resistor R35, and the fourteenth resistor R34 is electrically connected between the base and the emitter of the fifth triode Q7. The sixth capacitor C7, the fifth diode D16, the fourteenth resistor R34, and the fifteenth resistor R35 are mainly used for filtering, and to maintain the stable work of the whole delay circuit.

The working principles of the timing circuit and the delay circuit are described in detail in conjunction with FIG. 5 below.

When the first clamp and the second clamp are correctly connected to the electrodes of the vehicle battery 3, a voltage OUT+passes through the resistors R40 and the first resistor R2 and reaches the base of the first triode Q9 to activate the first MOS transistor Q8, and the first MOS transistor Q8 is switched on to provide a voltage to the timing circuit for work, such that the timing circuit works with a normal fixed-frequency (C18, R2 and R39 are configured to enhance the stability of the work). At the same time, the delay circuit is enabled to work for a limited time. After a V1 network (the V1 network refers to network nodes jointly formed by the eighth and fourth pins of the U2 and the drain of the first MOS transistor Q8 in FIG. 5) is energized, the fifth capacitor C15 is charged through the fifth diode D16, the eleventh resistor R41 and the eighth resistor R22; the second triode Q32 is conducted and the electrolytic capacitor CE1 is charged through the fourth diode D10; and the fifth triode Q7 is conducted through the twelfth resistor R28, to pull down a level of the base of the triode Q1 configured to control the relay (the base of the triode Q1 is used to receive the control signal output by the timing circuit, and is served as a control pin of the relay), such that the relay cannot be switched on to output, and the main purpose is to delay the output of the relay. At the same time, the tenth resistor R37 makes the third triode Q6 conduct to work, to pull down a level of the base of the fourth triode Q3, thereby stopping the fourth triode Q3 from working. When the fifth capacitor C15 is fully charged, the emitter of the second Q32 being a PNP transistor is not conducted. Due to a unidirectional characteristic of the fourth diode D10, the voltage may not flow backward, and the fifth triode Q7 is changed from on to off, thus the voltage is output to an ignition circuit (the relay is switched on). At this time, only the electrolytic capacitor CE1 continues to discharge the third triode Q6 through the tenth resistor R37, the third triode Q6 stops working when the electrolytic capacitor CE1 is discharged completely, a VDD network voltage (that is, a voltage of the output of the starting power supply after a voltage stabilization) passes from the R36 to the base of the fourth triode Q3, and makes the fourth triode Q3 switch on, to pull down the control pin of the relay of the timing circuit, such that the relay is switched off to achieve a control of a maximum conduction time of the switching device.

In addition, as shown in FIG. 5, the jumper cable further includes a voltage stabilizing circuit configured to provide a stable voltage for the other current in the jumper cable. The voltage stabilizing circuit may be implemented by a voltage stabilizing chip U3, and the U3 may be the voltage stabilizing chip of 78L05-SOT model. A peripheral circuit of U3 is shown in FIG. 5, the diode D1 is configured to prevent a reverse current, a capacitor C1 and a capacitor C2 are used for input filtering, and a capacitor C3, a capacitor C6 and an electrolytic capacitor CE3 are used as filtering capacitors for an output power supply.

The jumper cable further includes a normal working indicator. The normal working indicator is connected between the switching device (i.e. the relay) and the first input terminal Vcc+, and is configured to indicate a control state of the non-MCU controlling circuit 12 for the switching device 11 when the first clamp Vout+ and the second clamp Vout− are properly connected to the electrodes of the vehicle battery.

As shown in FIG. 5, the normal working indicator includes a first light emitting diode LED1 and a sixteenth resistor R1, an anode of the first light emitting diode LED1 is electrically connected with the first input terminal, a cathode of the first light emitting diode LED1 is electrically connected with the switching device 11 (RK−) through the sixteenth resistor R1, and the first light emitting diode LED1 is configured to illuminate when the switching device 11 is controlled to be switched on.

Accordingly, based on the above, the normal working indicator further includes a second light emitting diode LEDS and a second resistor R27, an anode of the second light emitting diode LEDS is electrically connected with the switching device 11, a cathode of the second light emitting diode LEDS is grounded through the second resistor R27, and the second light emitting diode LEDS is configured to illuminate when the switching device 11 is controlled to be switched off.

In FIG. 5, the first light emitting diode LED1 is connected with a light emitting diode LED7 in parallel at its two ends, which is mainly to improve a luminance when the switching device 11 is controlled to be switched on, to distinguish the luminance when the switching device 11 is controlled to be switched off. In specific implementation, a high power light emitting diode also may be directly used instead of the LED1 and the LED7.

Furthermore, the jumper cable further includes a reverse connection indicator, the reverse connection indicator is connected between the second clamp Vout− and the first clamp Vout+, and is configured to light up when the first clamp Vout+ is connected to the negative electrode of the vehicle battery and the second clamp Vout− is connected to the positive electrode of the vehicle battery.

FIG. 5 further shows a circuit structure of the reverse connection indicator 13 comprising a first light emitting diode LED2 and a third resistor R20. An anode of the third light emitting diode LED2 is electrically connected with the second clamp Vout−, and a cathode of the third light emitting diode LED2 is electrically connected with a first terminal of the third resistor R20, and a second terminal of the third resistor R20 is electrically connected with the first clamp Vout+. If there is a reverse connection, because the positive electrode of the vehicle battery 3 is connected with the second clamp Vout−, and the negative electrode of the vehicle battery 3 is connected with the first clamp Vout+, a path is formed among the positive electrode of the vehicle battery 3, the second clamp Vout−, the third light emitting diode LED2, the third resistor R20, the first clamp Vout+, and the negative electrode of the vehicle battery 3, and the third light emitting diode LED2 will illuminate.

Furthermore, the jumper cable 1 further includes: a detecting circuit and a protecting circuit. The detecting circuit is configured to detect whether a working parameter of the jumper cable is normal, and the protecting circuit is configured to control the switching device to be switched off when the detecting circuit detects that the working parameter is abnormal.

Furthermore, in the present embodiment, the jumper cable further includes an alarming circuit configured to raise an alarm in the form of buzzer or indicator light when the working parameter is abnormal. In FIG. 5, a buzzer BZ2 represents the buzzer, the LED3 and the LED6 are indicators for indicating working state. The peripheral circuit of the buzzer BZ2, the LED3 and the LED6 are shown in FIG. 5, and will not be described in detail here.

Furthermore, in the present embodiment, the detecting circuit includes: an input under-voltage detecting circuit, an input over-voltage detecting circuit, a temperature detecting circuit and/or an output over-voltage detecting circuit.

The input under-voltage detecting circuit is configured to detect whether an input voltage of the starting power supply is under voltage, and trigger the alarming circuit to raise an alarm in the form of buzzer or indicator light when an under-voltage is detected. The input over-voltage detecting circuit is configured to detect whether an input voltage of the starting power supply is over voltage, and trigger the alarming circuit to raise an alarm in the form of buzzer or indicator light when an over-voltage is detected.

As shown in FIG. 5, a detection for the input voltage can be achieved basing on an operational amplifier U1-B, and a detection principle is that: after the starting power supply 2 boosts the vehicle battery 3 through the jumper cable 1, a voltage input by the starting power supply 2 will pass through a voltage stabilizing circuit and a stable voltage of 5V is generated to provide power to the U1, an in-phase input terminal of the U1-B (pin 5), an inverted input terminal of the U1-B (pin 6) and corresponding devices performs a voltage division and comparison, to determine whether the input voltage EC5 is normal, if normal, an output terminal pin 7 will not output the voltage, if the voltage is too low, the pin 7 will output the voltage, the voltage passes through the diode D5, the resistor R4, and triode Q2 and makes the triode Q1 served as a pin controlling the relay to be switched on or off close, and the LED3 illuminates and the buzzer sounds.

A voltage stabilizing diode ZD2, a diode D9, a resistor R13, a resistor R4, a triode Q2, and the U1-B provide an input overvoltage protection, for example, when the voltage reaches 18V, the relay is switched off, and the buzzer sounds. The voltage stabilizing diode ZD2 is used for clamping voltage, the diode D9 prevents a reverse current, and the resistor R13 is used for limiting current, the resistor R4 and the triode Q2 are used for switching, when the voltage reaches a threshold (such as 18V), the voltage passes through the voltage stabilizing diode ZD2, the diode D9, and the resistor R13 and reaches the U1-B for the voltage comparison, and is output to the resistor R4 and the triode Q2 to achieve the control.

The temperature detecting circuit is configured to detect whether a working temperature of the jumper cable is normal. Referring to FIG. 5, an in-phase input terminal of the U1-A (pin 2), an inverted input terminal of the U1-A (pin 3) and corresponding devices performs a voltage division and comparison, to determine whether a temperature is normal, if normal, an output terminal pin 1 will not output the voltage, if the voltage is too low, the pin 1 will output the voltage, the voltage passes through the diode D5, the resistor R4, and triode Q2 and makes the triode Q1 served as the pin controlling the relay to be switched off, and the LED3 lights up and the buzzer continues sounding. A resistor R14, a resistor R10, and a capacitor C9 form a reference voltage for the U1-A, and a resistor R3, a capacitor C10, and a NTC form a comparison voltage for the U1-A. The resistance of the NTC changes with the temperature, that is, the comparison voltage may also change.

The output over-voltage detecting circuit is configured to detect whether a voltage of the vehicle battery is over voltage, and trigger the alarming circuit to raise an alarm in the form of buzzer or indicator light when the over-voltage is detected. Referring to FIG. 5, a voltage stabilizing diode ZD1, a diode D13, a resistor R21, a resistor R4 and a triode Q2 provide an output overvoltage protection. When the voltage reaches a threshold (such as 18V), the relay will be switched off and the buzzer continues sounding. The ZD1 is used for clamping voltage, the D13 prevents a reverse current, and the resistor R21 is used for limiting current, the resistor R4 and the triode Q2 are used for switching.

The operational amplifier U1-A and U1-B may be replaced by a common dual operational amplifier chip, such as an operational amplifier chip of LM358 model.

Furthermore, the jumper cable further includes: a unidirectional conducting component electrically positioned in a path between the second input terminal Vin− and the second clamp Vout− and having a conduction direction from the ground to the second clamp Vout−. The unidirectional conducting component is configured to ensure that the switching device 11 is not to be switched on through a unidirectional conducting characteristic thereof, thereby protecting the jumper cable when the first clamp Vout+ and the second clamp Vout− are reversely connected to the electrodes of the vehicle battery 3. Referring to FIG. 5 again, the unidirectional conducting component includes a third diode D12, an anode of the third diode D12 is grounded, and a cathode of the third diode D12 is connected with the second clamp Vout−.

The unidirectional conducting component may also be implemented by other circuits with unidirectional functionality.

Figure 7:
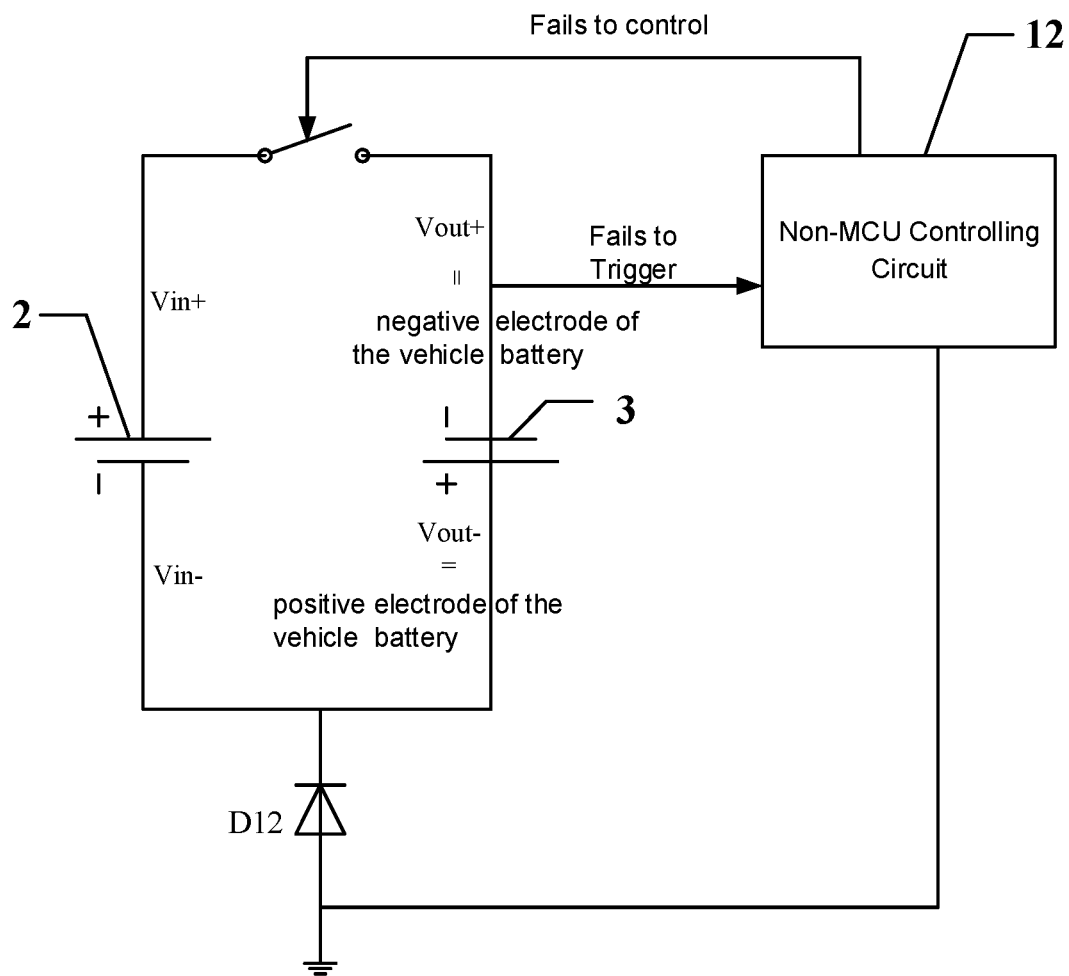
FIG. 7 is an equivalent circuit diagram of the jumper cable according to the first embodiment of the present disclosure having a unidirectional conducting component and being reversely connected to the electrodes of the vehicle battery.

When the first clamp Vout+ and the second clamp Vout− are reversely connected to the vehicle battery, an equivalent circuit is shown in FIG. 7. It can be seen that the starting power supply 2 and the vehicle battery 3 are equivalent to two power supplies in series. At this time, the second clamp Vout− is connected to the positive electrode of the vehicle battery 3, due to the existence of the third diode D12 and the switching device 11, the two power supplies connected in series, i.e., the starting power supply 2 and the vehicle battery 3, will not pass through the third diode D12 and reach the ground through non-MCU controlling circuit 12 to form a loop, and therefore no damage is caused to the voltage stabilizing circuit, as well as various detection circuits and protection circuits in FIG. 5.

A second embodiment of the present disclosure provides a starting power supply. The second embodiment is similar to the first embodiment, but differs from the first embodiment in that, the circuits of the jumper cable in the first embodiment are arranged in the inside of the starting power supply in the second embodiment.

Figure 8:
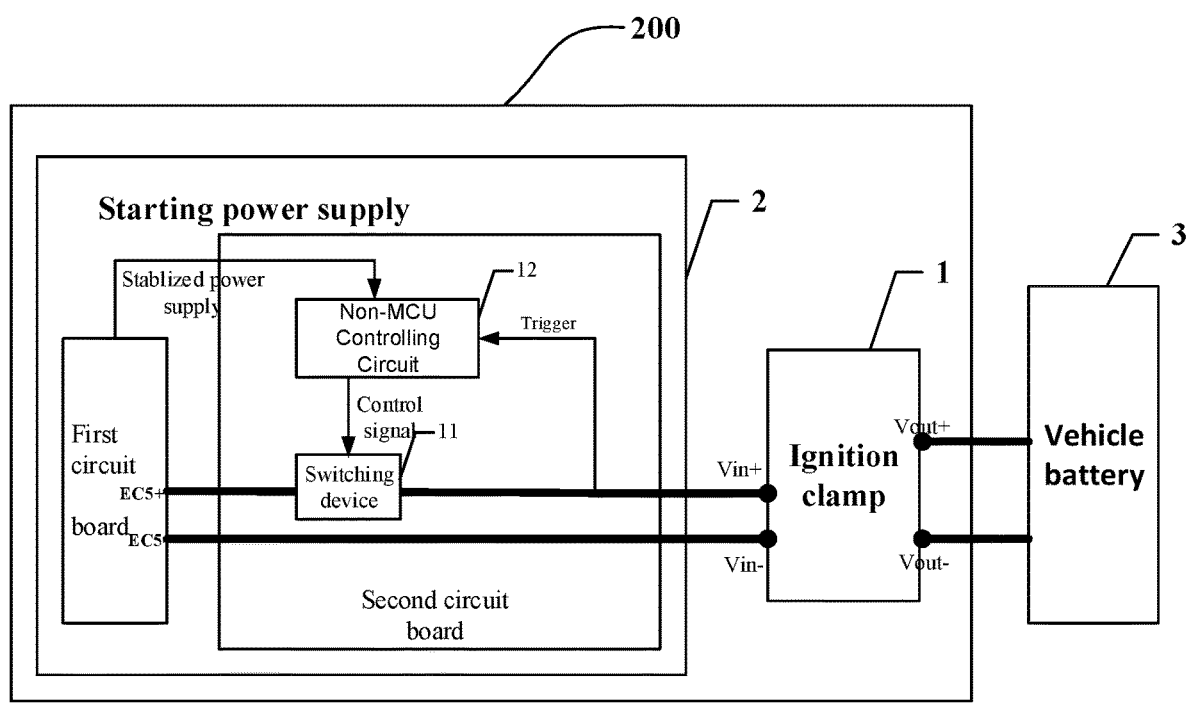
FIG. 8 is a block diagram of a jump start device according to a second embodiment of the present disclosure.

Referring to FIG. 8, a jump start device 200 provided in the second embodiment of the present disclosure includes a starting power supply 2 and a jumper cable 1. The starting power supply 2 includes a first circuit board and a second circuit board. The first circuit board is mainly configured to output a power supply to the second circuit board, however, no control signal transmission is involved between the first circuit board and the second circuit board. The first circuit board includes a positive electrode EC5+ and a negative electrode EC5−, and the negative electrode EC5− is configured to be electrically connected to a second input terminal Vin− of the jumper cable. The jumper cable 1 includes a first clamp Vout+ configured to be clamped to a positive electrode of a vehicle battery 3; a second clamp Vout− configured to be clamped to a negative electrode of the vehicle battery; a first input terminal Vin+ directly connected with the first clamp Vout+, and a second input terminal Vin− directly connected with the second clamp Vout−.

Figure 9:
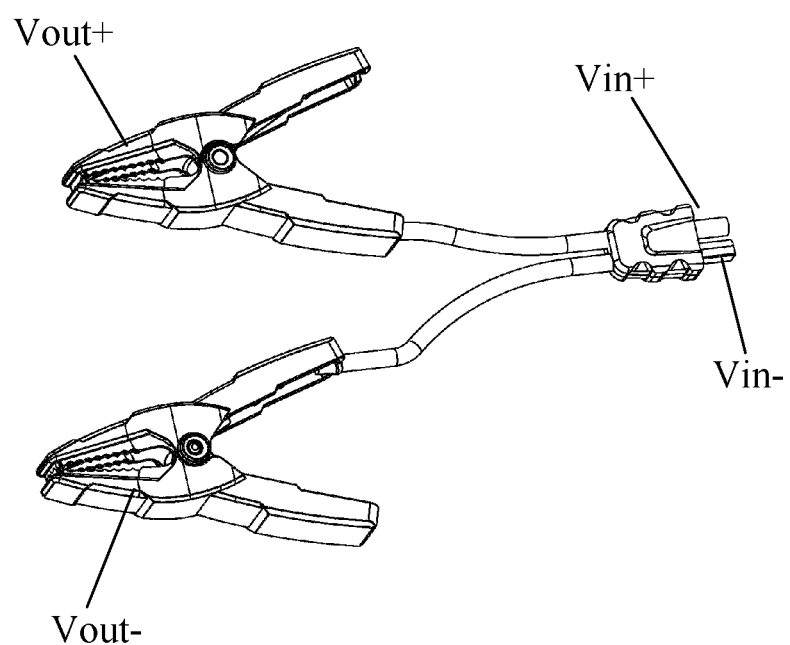
FIG. 9 is a structural schematic diagram of a jumper cable in the second embodiment of the present disclosure.

A shape design of the jumper cable 1 is shown in FIG. 9. It can be seen that the jumper cable 1 is only a simple conductive clamp including an input terminal having a plug (with a positive input port and a negative input port); an output terminal including two clamps; and wires between the input terminal and the output terminal.

The second circuit board of the starting power supply 2 includes a switching device 11. The first input terminal Vin+ is electrically connected with the positive electrode EC5+ of the starting power supply through the switching device 11.

A non-MCU controlling circuit 12 is electrically connected with a controlling terminal of the switching device 11, which is configured to control the switching device 11 to be switched on when the first clamp Vout+ and the second clamp Vout− are properly connected to the electrodes of the vehicle battery 3 such that a path is formed between the starting power supply 2 and the vehicle battery 3; and configured to not control the switching device 11 to be switched on when the first clamp Vout+ and the second clamp Vout− are reversely connected to the electrodes of the vehicle battery 3 such that no path can be formed activities between the starting power supply 2 and the vehicle battery 3.

The specific circuit structure of the non-MCU controlling circuit 12 is the same as that described in the first embodiment, and all of the voltage stabilizing circuit, the detecting circuit and the protection circuit in FIG. 5 can be built into the second circuit board, the circuitries of which will not be described in detail again.

In summary, the jumper cable provided by the embodiments of present disclosure has the functions of anti-reverse connection, and may also have input under-voltage protection, input over-voltage protection, output over-voltage protection, over-temperature protection and so on. The whole circuit is a pure hardware circuit having a fast response speed, and therefore an ignition may be executed more safely and effectively.

The above mentioned are only prefer embodiments of the present disclosure and shall not be used to limit the present disclosure. Any modification, equivalent substitution and improvement made in the spirit and principle of the present disclosure shall be included in the protection scope of the present disclosure.

What is claimed is:
1. A jumper cable, comprising:
 a first input terminal configured to be electrically connected with a positive electrode of a starting power supply; a second input terminal configured to be electrically connected with a negative electrode of the starting power supply; a first clamp configured to be clamped to a positive electrode of a vehicle battery; and a second clamp configured to be clamped to a negative electrode of the vehicle battery; wherein the second input terminal and the second clamp are electrically connected;

a switching device having a controlling terminal, wherein the first input terminal and the first clamp are electrically connected through the switching device; and a controlling circuit electrically connected with the controlling terminal of the switching device, and configured to control the switching device to be switched on when the first clamp and the second clamp are properly connected to the electrodes of the vehicle battery such that a path is formed between the starting power supply and the vehicle battery; and configured to not control the switching device to be switched on when the first clamp and the second clamp are reversely connected to the electrodes of the vehicle battery such that no path is formed between the starting power supply and the vehicle battery; wherein the controlling circuit does not include a MCU, wherein, the controlling circuit further comprises a triggering terminal, the triggering terminal is connected in circuit between the first clamp and the switching device; when the first clamp and the second clamp are properly connected to the electrodes of the vehicle battery, the triggering terminal gets electricity from the positive electrode of the vehicle battery through the first clamp, the controlling circuit is triggered to control the switching device to be switched on; and when the first clamp and the second clamp are reversely connected to the electrodes of the vehicle battery, the triggering terminal is unable to get electricity from the first clamp which is connected to the negative electrode of the vehicle battery, the controlling circuit is not triggered and fails to control the switching device to be switched on.

2. The jumper cable according to claim 1, wherein, the controlling circuit comprises a timing circuit electrically connected with the controlling terminal of the switching device; and wherein the timing circuit comprises the triggering terminal and is configured to output a control signal to the controlling terminal of the switching device when the triggering terminal gets electricity; and the control signal is configured to control the switching device to circularly execute activities of switch-on and switch-off in accordance with a preset switching frequency when the starting power supply boosts the vehicle battery.

3. The jumper cable according to claim 2, wherein, the timing circuit comprises a timing management chip U2, a first triode Q9 of an NPN transistor, and a first MOS transistor Q8, and wherein a base of the first triode Q9 serves as the triggering terminal;

when the first clamp and the second clamp are properly connected to the electrodes of the vehicle battery respectively, the vehicle battery supplies power to the base of the first triode Q9 through the first clamp, and the first triode Q9 controls the first MOS transistor Q8 to conduct, such that, an output of the starting power supply, after a voltage stabilization, supplies power to the timing management chip U2 through the first MOS transistor Q8; and an output of the timing management chip U2 is electrically connected with the controlling terminal of the switching device, and is configured to output the control signal.

4. The jumper cable according to claim 3, wherein, the timing management chip U2 is an NE555 timing chip; the timing circuit further comprises: a first resistor R2, a second resistor R30, a third resistor R31, a fourth resistor R32, a fifth resistor R38, a first capacitor C14, a second capacitor C16, a third capacitor C17, a first diode D14, and a second diode D15;

a first terminal of the first resistor R2 is electrically connected with the first clamp, a second terminal of the first resistor R2 is electrically connected with the base of the first triode Q9, an emitter of the first triode Q9 is grounded, the output of the starting power supply after the voltage stabilization is connected with a collector of the first triode Q9 through the fifth resistor R38;

after the voltage stabilization, the output of the starting power supply is connected with a source of the first MOS transistor Q8; a gate of the first MOS transistor Q8 is electrically connected with the collector of the first triode Q9, and a drain of the first MOS transistor Q8 is grounded through the second capacitor C16; and a first pin of the timing management chip U2 is grounded, a fifth pin of the timing management chip U2 is grounded through the first capacitor C14, a fourth pin and a eighth pin of the timing management chip U2 are both electrically connected with the drain of the first MOS transistor Q8; a second pin and a sixth pin of the timing management chip U2 are both electrically connected with a first terminal of the third capacitor C17, and a second terminal of the third capacitor C17 is grounded; the second pin and the sixth pin of the timing management chip U2 are further electrically connected with an anode of the second diode D15, and a cathode of the second diode D15 is electrically connected with the drain of the first MOS transistor Q8 successively through the second resistor R30 and the fourth resistor R32; a seventh pin of the timing management chip U2 is electrically connected with an anode of the first diode D14, and a cathode of the first diode D14 is electrically connected with the first terminal of the third capacitor C17; the seventh pin of the timing management chip U2 is further electrically connected with a point where the second resistor R30 and the fourth resistor R32 are connected in series; and a third pin of the timing management chip U2 is electrically connected with the controlling terminal of the switching device through the third resistor R31.

5. The jumper cable according to claim 3, wherein, the jumper cable further comprises a delay circuit; an output terminal of the delay circuit is electrically connected with the controlling terminal of the switching device, and is configured to further control a maximum conduction time of the switching device in the form of delay when the timing circuit controls the switching device, and controls the switching device to be switched off when a present starting ignition time reaches a preset maximum conduction time.

6. The jumper cable according to claim 1, wherein, the jumper cable further comprises a normal working indicator; the normal working indicator is connected between the switching device and the first input terminal, and is configured to indicate a control state of the controlling circuit for the switching device when the first clamp and the second clamp are properly connected to the electrodes of the vehicle battery.

7. The jumper cable according to claim 1, wherein, the jumper cable further comprises a reverse connection indicator;
the reverse connection indicator is connected between the second clamp and the first clamp, and is configured to illuminate when the first clamp and the second clamp are reversely connected to the electrodes of the vehicle battery.

8. The jumper cable according to claim 1, wherein, the jumper cable further comprises:
an unidirectional conducting component having a first terminal connected in circuit between the second input terminal and the second clamp and a second terminal grounded, wherein a conduction direction of the unidirectional conducting component is from the ground to the second clamp, and configured to ensure that the switching device is not to be switched on through an unidirectional conducting characteristic, thereby protecting the jumper cable when the first clamp and the second clamp are reversely connected to the electrodes of the vehicle battery.

9. The jumper cable according to claim 8, wherein, the unidirectional conducting component comprises a third diode D12, an anode of the third diode D12 is grounded, and a cathode of the third diode D12 is connected with the second clamp.

10. The jumper cable according to claim 1, wherein, the switching device comprises a power relay.

11. A jump start device, comprising a starting power supply, and a jumper cable according to claim 1.

12. A starting power supply, configured to be connected to a jumper cable having first and second input terminals, wherein, the starting power supply comprises a positive electrode and a negative electrode, the negative electrode is configured to be electrically connected with the second input terminal of the jumper cable; the jumper cable further comprises a first clamp configured to be clamped to a positive electrode of a vehicle battery and a second clamp configured to be clamped to a negative electrode of the vehicle battery; the first input terminal is electrically connected with the first clamp, and the second input terminal is electrically connected with the second clamp;
wherein the starting power supply further comprises:
a switching device having a controlling terminal, wherein the first input terminal and the positive electrode of the starting power supply are electrically connected through the switching device; and
a controlling circuit electrically connected with the controlling terminal of the switching device, and configured to control the switching device to be switched on when the first clamp and the second clamp are properly connected to the electrodes of the vehicle battery such that a path is formed between the starting power supply and the vehicle battery;
and configured to not control the switching device to be switched on when the first clamp and the second clamp are reversely connected to the electrodes of the vehicle battery such that no path is formed between the starting power supply and the vehicle battery; wherein the controlling circuit does not include a MCU,
wherein, the controlling circuit further comprises a triggering terminal, the triggering terminal is electrically connected to a position whereby the switching device and the first input terminal are connected; when the triggering terminal gets electricity from a wire between the first input terminal and the switching device, the controlling circuit is triggered to control the switching device to be switched on; and when the triggering terminal fails to get electricity from the wire between the first input terminal and the switching device, the controlling circuit is not triggered and fails to control the switching device to be switched on.

13. The starting power supply according to claim 12, further comprising an unidirectional conducting component having a first terminal connected in circuit between the switching device and the second input terminal and a second terminal grounded, wherein unidirectional conducting component has a conduction direction from the ground to the second input terminal, and is configured to ensure that the switching device is not to be switched on through an unidirectional conducting characteristic, thereby protecting the jumper cable when the first clamp and the second clamp are reversely connected to the electrodes of the vehicle battery.

14. The starting power supply according to claim 13, wherein, the unidirectional conducting component comprises a third diode D12, an anode of the third diode D12 is grounded, and a cathode of the third diode D12 is connected with the second input terminal.

15. The starting power supply according to claim 12, wherein, the switching device comprises a power relay.

16. The starting power supply according to claim 12, wherein, the controlling circuit comprises a timing circuit electrically connected with the controlling terminal of the switching device; and
the timing circuit comprises the triggering terminal and is configured to output a control signal to the controlling terminal of the switching device when the triggering terminal gets electricity; and the control signal is configured to control the switching device to circularly execute activities of switch-on and switch-off in accordance with a preset switching frequency when the starting power supply boosts the vehicle battery.

17. The starting power supply according to claim 16, wherein, the timing circuit comprises a timing management chip U2, a first triode Q9 of an NPN transistor, and a first MOS transistor Q8, and wherein a base of the first triode Q9 serves as the triggering terminal;
when the first clamp and the second clamp are properly connected to the electrodes of the vehicle battery, the vehicle battery passes successively through the first clamp and the first input terminal and supplies power to the base of the first triode Q9, and the first triode Q9 controls the first MOS transistor Q8 to conduct, such that, an output of the starting power supply after a voltage stabilization supplies power to the timing management chip U2 through the first MOS transistor Q8; and
an output of the timing management chip U2 is electrically connected with the controlling terminal of the switching device, and is configured to output the control signal.

18. The starting power supply according to claim 17, further comprising a delay circuit; an output terminal of the delay circuit is electrically connected with the controlling terminal of the switching device, and is configured to further control a maximum conduction time of the switching device in the form of delay when the timing circuit controls the switching device, and controls the switching device to be switched off when a present starting ignition time reaches a preset maximum conduction time.

* * * * *